(12) United States Patent
Houser et al.

(10) Patent No.: US 10,930,045 B2
(45) Date of Patent: Feb. 23, 2021

(54) DIGITAL INK BASED VISUAL COMPONENTS

(71) Applicant: Microsoft Technology Licensing, LLC, Redmond, WA (US)

(72) Inventors: Robert C. Houser, Bellevue, WA (US); Pavel Yurevich, Redmond, WA (US); Peter Hammerquist, Shoreline, WA (US); David Abzarian, Kenmore, WA (US); Xiao Tu, Medina, WA (US); Silvano Bonacina, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

(21) Appl. No.: 15/465,859

(22) Filed: Mar. 22, 2017

(65) Prior Publication Data

US 2018/0276858 A1 Sep. 27, 2018

(51) Int. Cl.
*G06T 13/80* (2011.01)
*G06T 11/00* (2006.01)

(52) U.S. Cl.
CPC ............ *G06T 13/80* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 4,620,287 A | 10/1986 | Yam | |
| 5,633,955 A | 5/1997 | Bozinovic et al. | |
| 6,208,355 B1 | 3/2001 | Schuster | |
| 6,340,981 B1 | 1/2002 | Graham et al. | |
| 6,549,675 B2 | 4/2003 | Chatterjee | |
| 6,909,430 B2 * | 6/2005 | Dresevic | G06F 3/04883 345/443 |
| 7,705,848 B2 * | 4/2010 | Bronstein | G06K 9/00463 345/442 |
| 7,777,745 B2 | 8/2010 | Sander et al. | |
| 8,633,930 B2 * | 1/2014 | Mansfield | G06T 11/60 345/442 |
| 9,207,858 B2 | 12/2015 | Antonyuk et al. | |
| 9,443,332 B2 | 9/2016 | Brumer et al. | |

(Continued)

OTHER PUBLICATIONS

"Draw shapes", http://web.archive.org/web/20161127074503/https:/msdn.microsoft.com/en-us/windows/uwp/graphics/drawing-shapes, Published on: Nov. 27, 2016, 12 pages.

(Continued)

*Primary Examiner* — Michael J Cobb
(74) *Attorney, Agent, or Firm* — Fiala & Weaver P.L.L.C.

(57) ABSTRACT

Digital ink is generated to represent a visual component, such as a letter, number, character, and/or other symbol. The digital ink is generated by obtaining multiple different curves that combine to generate the visual component. These different curves can have various different characteristics (e.g., different thicknesses) to provide the desired visual component. The combined curves are converted into a set of primitives that make up the parts of the combined curves, and the set of primitives are converted into a digital ink format. Data describing the set of primitives in digital ink format can be stored and subsequently used to display the visual component as digital ink.

20 Claims, 6 Drawing Sheets

(56) References Cited

U.S. PATENT DOCUMENTS

| | | | | |
|---|---|---|---|---|
| 2003/0025675 | A1* | 2/2003 | Dresevic | G06T 11/203 |
| | | | | 345/173 |
| 2004/0024575 | A1 | 2/2004 | Surazhsky et al. | |
| 2006/0227116 | A1* | 10/2006 | Zotov | G06F 3/0418 |
| | | | | 345/173 |
| 2006/0290698 | A1 | 12/2006 | Wang et al. | |
| 2012/0050293 | A1 | 3/2012 | Carlhian et al. | |
| 2013/0069956 | A1* | 3/2013 | Tristram | G06T 13/20 |
| | | | | 345/473 |
| 2014/0240322 | A1* | 8/2014 | Brumer | G06T 11/203 |
| | | | | 345/442 |
| 2015/0338939 | A1* | 11/2015 | Vong | H04L 65/403 |
| | | | | 345/179 |
| 2016/0078649 | A1 | 3/2016 | Bonacina et al. | |
| 2016/0253300 | A1 | 9/2016 | Tu et al. | |
| 2016/0337416 | A1* | 11/2016 | Galbraith | G06F 3/0421 |
| 2017/0277674 | A1* | 9/2017 | Zhou | G06F 3/03545 |

OTHER PUBLICATIONS

"Shapes and Basic Drawing in WPF Overview", http://web.archive.org/web/20150110163302/http:/msdn.microsoft.com/en-us/library/ms747393(v=vs.110).aspx, Published on: Jan. 10, 2015, 9 pages.

"Path", http://www.w3.org/TR/SVG11/paths.htmlhttp:/www.w3.org/TR/SVG11/paths.htmlhttp:/web.archive.org/web/20150110163302/http:/msdn.microsoft.com/en-us/library/ms747393(v=vs.110).aspx, Published on: Aug. 16, 2011, 49 pages.

Sarkar, Dona, "Announcing Windows 10 Insider Preview Build 14951 for Mobile and PC", https://blogs.windows.com/windowsexperience/2016/10/19/announcing-windows-10-insider-preview-build-14951-for-mobile-and-pc/, Published on: Oct. 19, 2016, 32 pages.

\* cited by examiner

DIGITAL INK BASED VISUAL COMPONENTS

BACKGROUND

Many computing devices provide user interfaces via which various information can be displayed to users. These user interfaces can include various letters, numbers, characters, and other visual components that are displayed for the user. Although such user interfaces are valuable to users, they are not without their problems. One such problem is that if quick display of letters and numbers is desired, traditional frameworks can be too time-consuming to provide the desired speed. Another such problems is that in low-resource devices (e.g., slow processors and/or small amounts of memory), traditional frameworks for displaying letters and numbers can be too resource intensive. This can lead to user frustration with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, multiple curves that combine to generate a visual component are obtained. The multiple curves are converted into a set of primitives, and the set of primitives is converted into a digital ink format. The visual component is stored in the digital ink format.

In accordance with one or more aspects, data describing a visual component in a digital ink format is retrieved from a visual component store and the visual component is displayed. The retrieved data is data that has been generated by obtaining multiple curves that combined to generate the visual component, converting the multiple curves into a set of primitives, and converting the set of primitives into a digital ink format.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Digital ink based visual components are discussed herein. Generally, digital ink is used to create a vector based visual component without the need to rasterize the visual components and without incurring the extra memory overhead of a separate subsystem to support rasterization. A visual component can be any of a variety of different components that can be displayed as part of a user interface, such as letters, numbers, characters, other symbols, borders or outlines, ribbons, and so forth. The digital ink is generated by obtaining multiple different curves (Bezier curves) that combine to generate the visual component. These different curves can have various different characteristics (e.g., different widths or thicknesses) to provide the desired visual component.

The combined curves are then converted into a set of primitives (e.g., a set of paths that outline the combined curves) that make up the parts of the combined curves. Various positioning information is also optionally provided for the visual component, allowing multiple different visual components to be created and displayed in a uniform manner. For example, each visual component can be one character of a font set, and the positioning information allows the different characters to be displayed in a uniform manner (e.g., as if they were along the same line).

The set of primitives is then converted into a digital ink format, and saved as digital ink in a visual component store. The digital ink for multiple different visual components can optionally be stored together (e.g., as part of a font set). The visual component can then be displayed when desired by a visual component display system displaying the digital ink.

By describing visual components as digital ink, the underlying framework used to display the visual components is a digital inking framework. More comprehensive display frameworks for rendering text or other visual components need not be employed, thereby reducing processor consumption in the device displaying the visual component as well as reducing memory usage in the device displaying the visual component.

Figure 1:
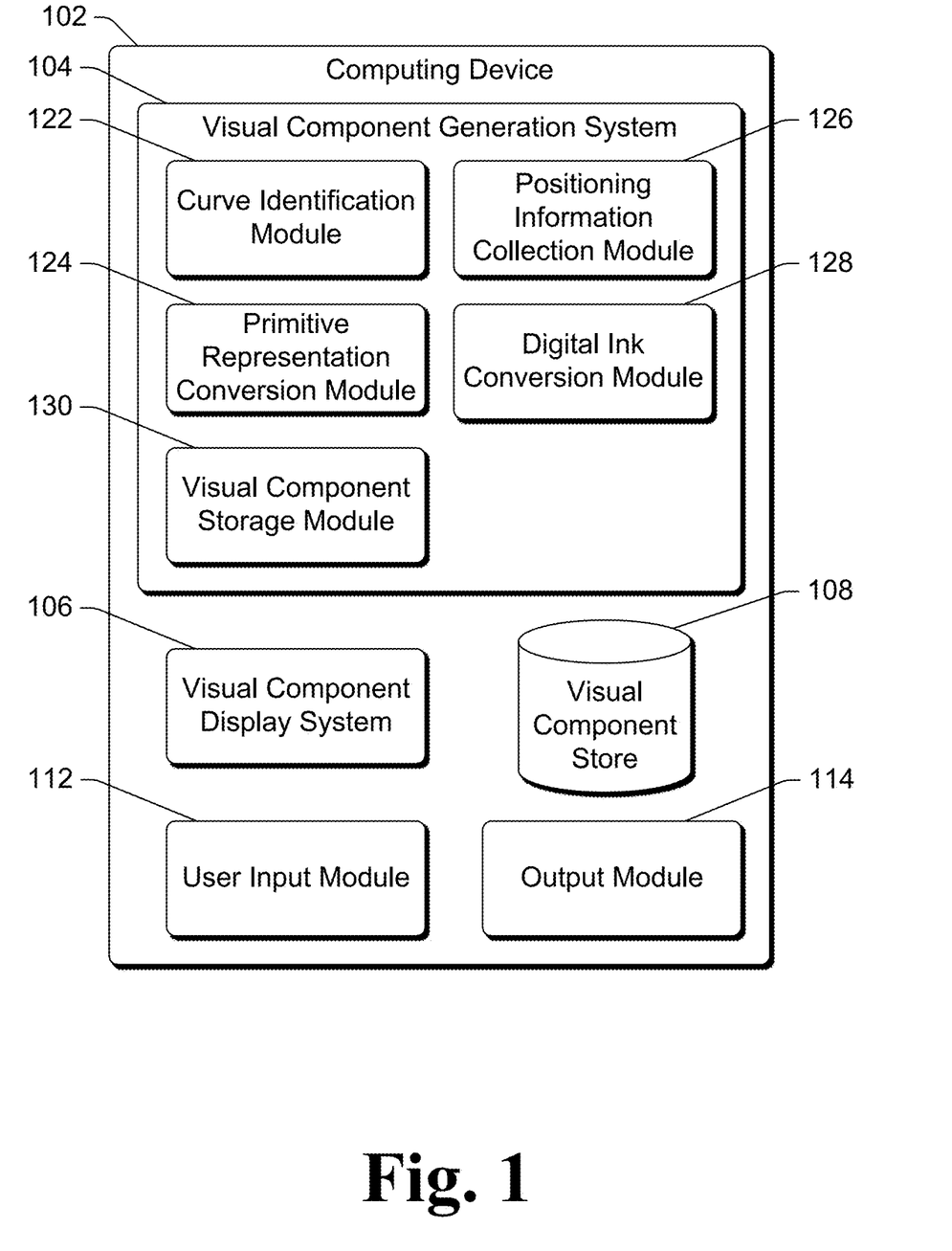
FIG. 1 is a block diagram illustrating an example computing device implementing the digital ink based visual components in accordance with one or more embodiments.

FIG. 1 is a block diagram illustrating an example computing device 102 implementing the digital ink based visual components in accordance with one or more embodiments. The computing device 102 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, virtual reality (VR) device, augmented reality (AR) device), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

The computing device 102 includes a visual component generation system 104, a visual component display system 106, and a visual component store 108. The visual component generation system 104 generates and stores digital ink based visual components in the visual component store 108. The visual component generation system 104 uses digital ink to create vector based visual components, such as fonts, without the need to rasterize the visual components and without extra memory overhead of a separate subsystem for rasterization of the visual components. The visual component store 108 can be any of a variety of different types of storage devices, such as a magnetic disk, an optical disc, and so forth. The visual component store 108 can be part of the computing device 102 as illustrated, and can optionally be a removable storage device (e.g., a thumb drive or universal serial bus (USB) drive).

Additionally or alternatively, the visual component store 108 can be a storage device separate from the computing device 102. The computing device 102 can communicate with a separate storage device implementing the visual component store 108 via any of a variety of different connections. The computing device 102 and the storage device can be coupled to one another via a wired or wireless connection, such as a USB connection, a wireless USB connection, an infrared connection, a Bluetooth connection, a DisplayPort connection, a PCI (a peripheral component interconnect) Express connection, and so forth. The computing device 102 and the storage device alternatively or additionally be connected to one another via a data network, such as the Internet, a local area network (LAN), a public telephone network, an intranet, other public and/or proprietary networks, combinations thereof, and so forth.

The computing device 102 also includes a user input module 112 and an output module 114. The user input module 112 receives user inputs from a user of the computing device 102. User inputs can be provided in a variety of different manners, such as by pressing one or more keys of a keypad or keyboard of the computing device 102, pressing one or more keys of a controller (e.g., remote control device, mouse, track pad, etc.) of the computing device 102, pressing a particular portion of a touchpad or touchscreen of the computing device 102, making a particular gesture on a touchpad or touchscreen of the computing device 102, and/or making a particular gesture on a controller (e.g., remote control device, mouse, track pad, etc.) of the computing device 102. User inputs can also be provided via other physical feedback input to the computing device 102, such as tapping any portion of the computing device 102, an action that can be recognized by a motion detection or other component of the computing device 102 (such as shaking the computing device 102, rotating the computing device 102, bending or flexing the computing device 102, etc.), and so forth. User inputs can also be provided in other manners, such as via voice or other audible inputs to a microphone, via motions of hands or other body parts observed by an image capture device, and so forth.

The output module 114 generates, manages, and/or outputs content for display, playback, and/or other presentation. This content can be created by the output module 114 or obtained from other modules of the computing device 102. This content can be, for example, a display or playback portion of a user interface (UI). The content can be displayed or otherwise played back by components of the computing device 102 (e.g., speakers, interactive display devices, etc.). Alternatively, the output module 114 can generate one or more signals that are output to other devices or components (e.g., speakers, display devices, etc.) that are separate from the computing device 102.

The visual component generation system 104 generates a digital ink based visual component. A visual component can be any of a variety of different components that can be displayed to a user. These components can include, for example, letters, numbers, characters or other symbols, borders or outlines, ribbons, boxes, and so forth. In one or more embodiments, the visual components are a set of letters, numbers, and other characters that make up a font set. The visual components can be displayed on their own, or as part of another visual component. For example, the visual components can be numbers that are displayed on a ruler that is displayed on a display device.

Generally, digital ink refers to freehand input to a touch-sensing device, such as a touchscreen, which is interpreted by the computing device as digital ink (or simply "ink"). This input is analyzed by a digital ink system and ink stroke data is generated. The ink stroke data refers to various information describing the digital ink input, such as the coordinates on the input device where the digital ink input occurred and pressure information indicating an amount of pressure applied at each of those coordinates for the digital ink input. The techniques discussed herein receive input in a different manner than traditional digital ink, but save data representing a visual component in a digital ink format. Thus, traditional digital ink systems are able to display the visual components despite the visual components not having been input by traditional digital inking techniques, and need have no knowledge of how the visual components were generated.

The visual component generation system 104 includes a curve identification module 122, a primitive representation conversion module 124, a positioning information collection module 126, a digital ink conversion module 128, and a visual component storage module 130.

As part of generating a digital ink based visual component, the curve identification module 122 obtains multiple different curves that combine to generate the visual component. The curve identification module 122 receives inputs from a user of the computing device 102 specifying the multiple curves, the characteristics of the multiple curves, and how those curves are combined together to generate the visual component. The inputs can be received via the user input module 112 via any of a variety of different types of inputs as discussed above.

The characteristics of a curve are various properties or values that describe the curve, such as the locations of end points of the curve, the width of the curve (e.g., a thickness of the line that is a visual representation of the curve), the shapes of the end points of the curve (e.g., rounded, square, pointed, etc.), and so forth. The curves can be combined in different manners, such as an endpoint of one curve touching the endpoint of another curve, the curves overlapping in some manner, and so forth. The user is thus able to specify whatever type or combination of curves that he or she desires. Given the different characteristics that different curves can have, a visual component generated from multiple curves can have different characteristics in different parts of the visual component (e.g., if the visual component is a number 3, different parts of the number 3 can have different characteristics (e.g., different thicknesses)).

In one or more embodiments, the curve identification module 122 provides various automated tools to assist users in specifying the multiple curves. The automated tools can include drawing tools allowing users to specify endpoints of a curve, the shape of a curve, the width of a curve, and/or other characteristics of a curve. These automated tools can also include copying curves and increasing or decreasing the sizes of curves (e.g., a tool to increase the size of a curve by 50%, 100%, 200%, or any other desired amount, a tool to decrease the size of a curve by 20%, 50%, 100%, or any other desired amount).

In one or more embodiments, the curves discussed herein are Bezier curves. A Bezier curve refers to a digital representation of any type of curve.

Figure 2:
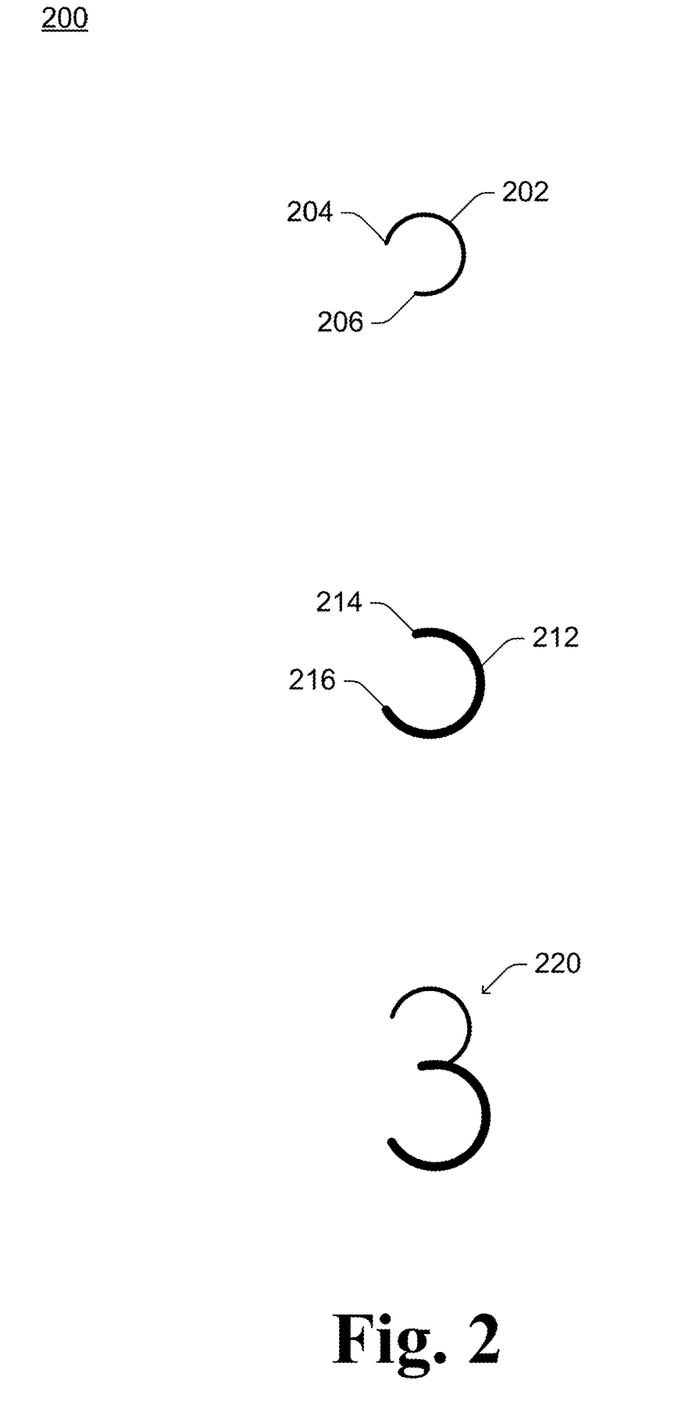
FIG. 2 illustrates an example of defining multiple different curves that combine to generate a visual component.

FIG. 2 illustrates an example 200 of defining multiple different curves that combine to generate a visual component. In the example 200, the visual component being generated is the number 3. A curve 202 is specified by a user of the computing device 102, the curve 202 including endpoints 204 and 206. The endpoints 204 and 206 are specified by the user, as well as additional characteristics of the curve 202 such as the thickness or weight of the curve, a pattern of the curve, the shapes of endpoints of the curve, and so forth. The curve 202 can be specified by the user in various manners, such as selection of the curve 202 from a library of curves (e.g., dragging and dropping a curve from a library), drawing the curve 202 via a touch input (e.g., finger, pen, etc.) on a touchscreen of the computing device 102, drawing the curve using a mouse or other cursor control device, and so forth. In one or more embodiments, the endpoints 204 and 206 have coordinates within some bounding box or window, such as coordinates in a Cartesian coordinate system.

A curve 212 is also specified by a user of the computing device 102, the curve 212 including endpoints 214 and 216. The endpoints 214 and 216 are specified by the user, as well as additional characteristics of the curve 212 such as the thickness or weight of the curve, a pattern of the curve, the shapes of endpoints of the curve, and so forth. The curve 212 can be specified by the user in various manners, such as selection of the curve 212 from a library of curves (e.g., dragging and dropping a curve from a library), drawing the curve 212 via a touch input (e.g., finger, pen, etc.) on a touchscreen of the computing device 102, drawing the curve using a mouse or other cursor control device, and so forth. In one or more embodiments, the endpoints 214 and 216 have coordinates within the same bounding box or window as the endpoints 204 and 206 of the curve 202. These coordinates can be, for example, coordinates in a Cartesian coordinate system.

A user input to combine the curves 202 and 212 so that the endpoints 206 and 214 overlap is also received. In response, curves 202 and 212 are combined and the visual component 220 is generated.

It should be noted that the example of FIG. 2 is a simplistic example involving only two curves. A visual component can be made up of any number of curves having various characteristics as desired by the user. Furthermore, it should be noted that although the example of FIG. 2 is a number, the techniques discussed herein can be used to generate any of a variety of different visual components. For example, the techniques discussed herein can be used to generate the letters, numbers, characters and other symbols of a font set. By way of another example, the techniques discussed herein can be used to generate borders or outlines for display, ribbons for display (e.g., as part of a ribbon bar of an application), and so forth.

Returning to FIG. 1, the primitive representation conversion module 124 converts the multiple curves obtained by the curve identification module 122 into a set of primitives. This set of primitives is a set or group of paths that outline the multiple curves. Each path outlines at least part of at least one of the multiple curves. In one or more embodiments, each path represents the geometry of the outline of at least part of a curve, and is defined in terms of one or more of the following elements: setting a new current point (e.g., a "moveto" command), drawing a straight line (e.g., a "lineto" command), drawing a curve using a cubic Bezier (e.g., a "curveto" command), drawing an elliptical or circular arc (e.g., a "arc" command), and closing the current shape by drawing a line to the last "moveto" point (e.g., a "closepath" command). A path can be, for example, a path as defined in the Scalable Vector Graphics (SVG) Version 1.1 W3C Recommendation (Aug. 16, 2011), Section 8 (Paths).

The positioning information collection module 126 obtains positioning information for the visual component. The positioning information for the visual component refers to how the visual component is positioned when displayed with other visual components. In one or more embodiments, the positioning information is a set of coordinates (e.g., x,y coordinates in a Cartesian coordinate system) for the visual component within a particular bounding box. This set of coordinates can be for a particular part of the visual component, such as the lower left most point of the visual component when displayed. Using this positioning information allows multiple visual components to be displayed in a uniform and visually appealing manner. For example, the positioning information can be used to allow all of the visual components to be displayed as if they were resting on (or in some cases below) the same horizontal line.

The positioning information can be obtained in a variety of different manners. In one or more embodiments, the positioning information collection module 126 applies various different rules or criteria to obtain the positioning information. These rules or criteria can be, for example, that the lower left most part of the visual component is to be assigned a particular coordinate (e.g., an x,y coordinate of 5,5) within a particular bounding box. Additionally or alternatively, the positioning information collection module 126 can obtain an indication of the positioning information from a user of the computing device 102. For example, a user input indicating the positioning information can be received in any of a variety of different manners as discussed above. E.g., a user input dragging and dropping the visual component at the location desired by the user within a bounding box can be received, and this location can be assigned as the positioning information for the visual component (e.g., the lower left most part of the visual component can be assigned the coordinate of the location where the lower left most part of the visual component is situated in the bounding box).

The digital ink conversion module 128 converts the primitive representation of the multiple curves (as generated by the primitive representation conversion module 124) into digital ink. Converting the primitives of the multiple curves into digital ink refers to generating data, in a digital ink format, describing the primitives of the multiple curves. The digital ink conversion module 128 analyzes the set of primitives and generates ink stroke data from the set of primitives. This analysis and ink stroke data generation can be performed in various manners, such as by identifying locations within the primitives (e.g., in a given coordinate system, such as a Cartesian coordinate system) and the widths or thicknesses of the primitives at those locations (e.g., the width of the portion of a path at a given location).

The digital ink conversion module 128 makes the data describing the primitives of the multiple curves, in the digital ink format, available to the visual component storage module 130. The visual component storage module 130 then stores the data describing the primitives of the multiple curves, in the digital ink format, in the visual component store 108 as the visual component. The visual components thus stored are generated without the need to rasterize the visual components, allowing the visual components to be generated without rasterization (or the extra memory overhead of a subsystem supporting rasterization). These visual components stored in the visual component store 108 can be made available to any programs running on the computing device 102, allowing such programs to leverage the visual components generated by the visual component generation system 104. The visual components can be stored in various different manners, such as using an as ink serialization format (ISF) or Extensible Markup Language (XML) file.

In one or more embodiments, the visual component storage module 130 also obtains the positioning information from the positioning information collection module 126 and stores the positioning information in the visual component store 108 along with the visual component. The positioning information can be, for example, metadata associated with the visual component.

The visual component display system 106 retrieves the data describing a visual component from the visual component store 108 and displays the visual component via the output module 114. The visual component can be displayed on a display device of the computing device 102 or alternatively another display device. The visual component is stored using a digital ink format, and the visual component is displayed as digital ink. Because the visual components are stored as digital ink, the visual components can be displayed by the visual component display system 106 without rasterizing the visual components and without the computing device 102 incurring the extra memory overhead of a subsystem supporting rasterization. Additional frameworks for generating and displaying various different characters, numbers, or other visual components need not be employed by the visual component display system 106. For example, the visual components are not bitmaps, and thus a framework for displaying bitmaps need not be employed by the visual component display system 106.

Figure 3:
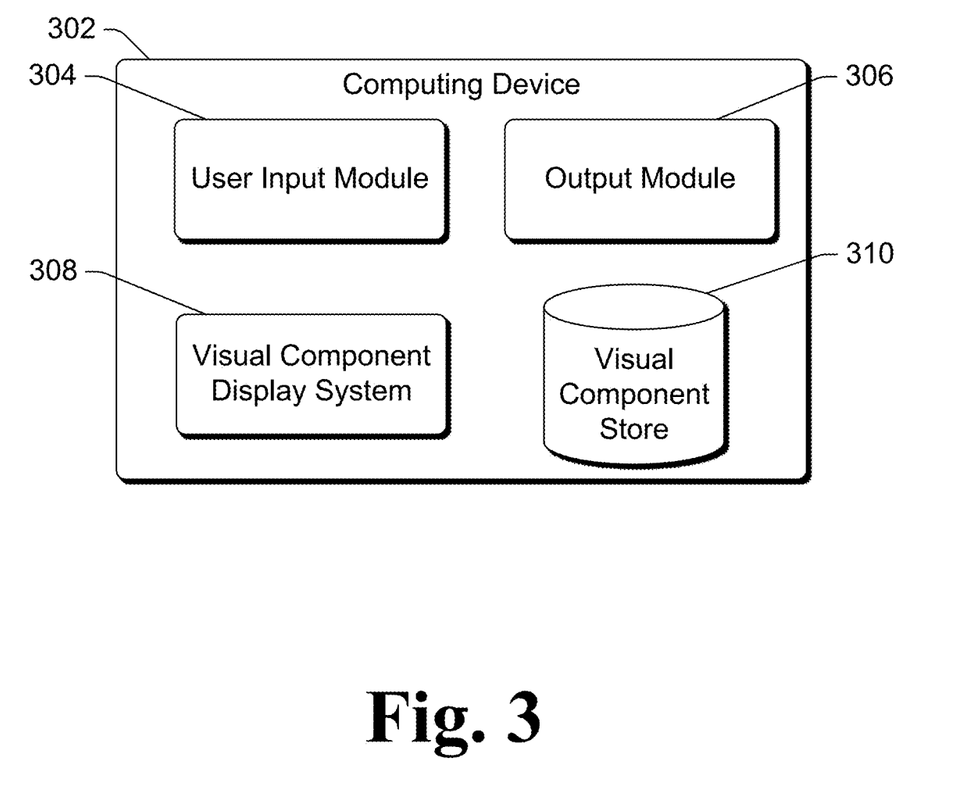
FIG. 3 illustrates an example computing device that can be used to display the digital ink based visual components.

The visual components can also be displayed on other devices. FIG. 3 illustrates an example computing device 302 that can be used to display the digital ink based visual components. Computing device 302 is similar to computing device 102, including a user input module 304 that is analogous to the user input module 112 of FIG. 1, an output module 306 that is analogous to the output module 114, a visual component display system 308 that is analogous to the visual component display system 106 of FIG. 1. The computing device 302 also includes a visual component store 310 that is analogous to (or alternatively is the same as) the visual component store 108 of FIG. 1. The visual components stored in the visual component store 31—can be made available to any programs running on the computing device 302, allowing such programs to leverage the visual components generated by the visual component generation system on another computing device.

The visual component store 310 stores data describing one or more visual components in a digital ink format. These are the visual components generated by, for example, the visual component generation system 104 of FIG. 1. The visual component display system 308 retrieves the data describing a visual component from the visual component store 108 and displays the visual component via the output module 306. The visual component can be displayed on a display device of the computing device 102 or alternatively another display device. The visual component is stored using a digital ink format, and the visual component is displayed as digital ink. Thus, the visual components can be displayed on devices, such as computing device 302, that are not the devices on which the visual components were generated and/or that do not include a visual component generation system. Similar to the visual component display system 106 discussed above, because the visual components are stored as digital ink, the visual components can be displayed by the visual component display system 308 without rasterizing the visual components and without the computing device 302 incurring the extra memory overhead of a subsystem supporting rasterization.

Figure 4:
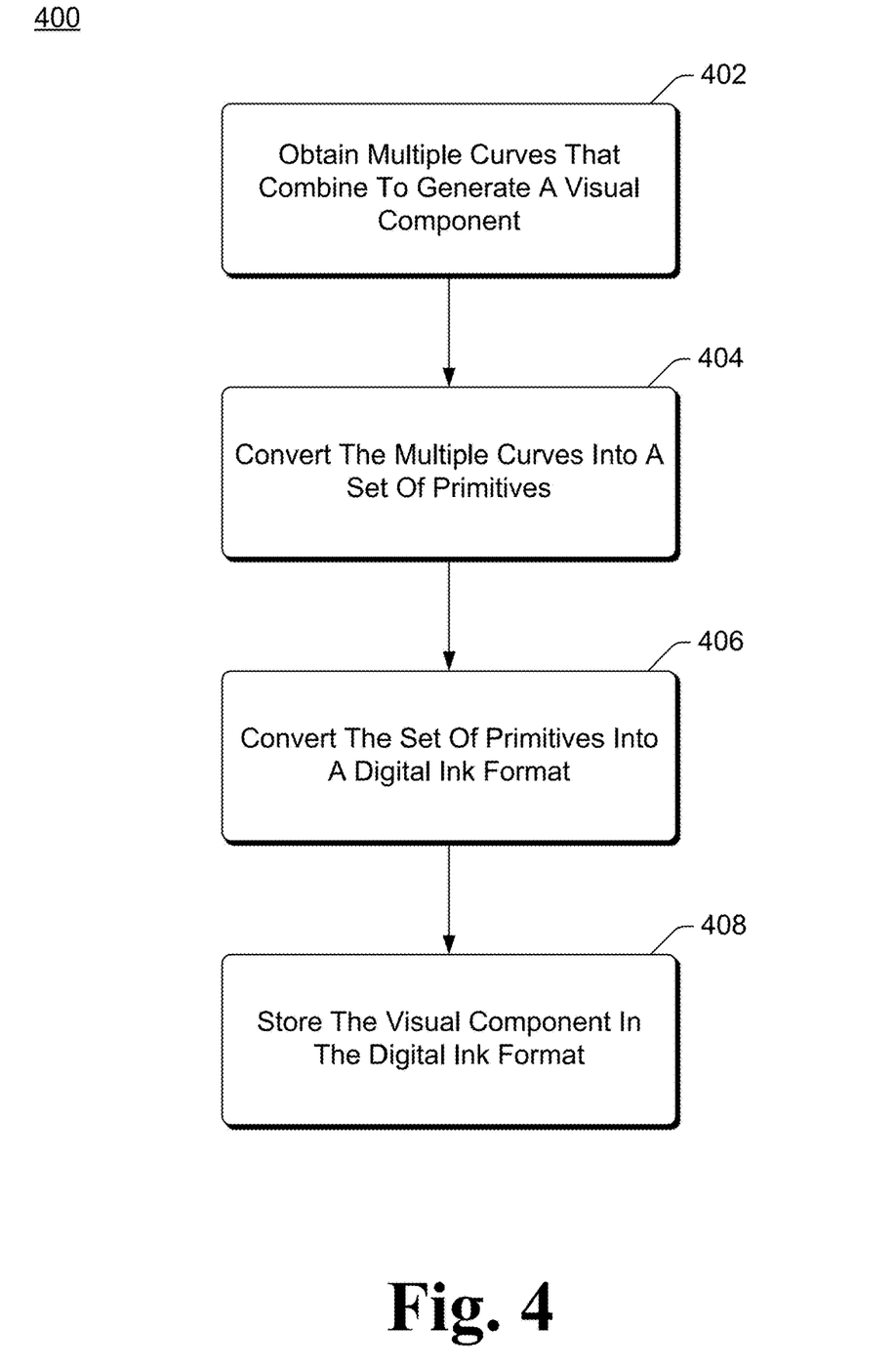
FIG. 4 is a flowchart illustrating an example process for generating and storing digital ink based visual components in accordance with one or more embodiments.

FIG. 4 is a flowchart illustrating an example process 400 for generating and storing digital ink based visual components in accordance with one or more embodiments. Process 400 is carried out by a device, such as computing device 102 of FIG. 1, and can be implemented in software, firmware, hardware, or combinations thereof. Process 400 is shown as a set of acts and is not limited to the order shown for performing the operations of the various acts. Process 400 is an example process for generating and storing digital ink based visual components; additional discussions of generating and storing digital ink based visual components are included herein with reference to different figures.

In process 400, multiple curves that combine to generate a visual component are obtained (act 402). These multiple curves are obtained, for example, by user inputs specifying the multiple curves.

The multiple curves are converted into a set of primitives (act 404). These primitives are, for example, paths that each represent the geometry of the outline of at least part of one or more of the multiple curves.

The set of primitives is converted into a digital ink format (act 406). The primitives are converted into a digital ink format by generating ink stroke data that represents the primitives as discussed above.

The visual component is stored in the digital ink format (act 408). The visual component is stored in a visual component store, and can optionally be communicated to multiple different visual component stores. Accordingly, the visual component can be displayed at any of a variety of different computing devices.

Figure 5:
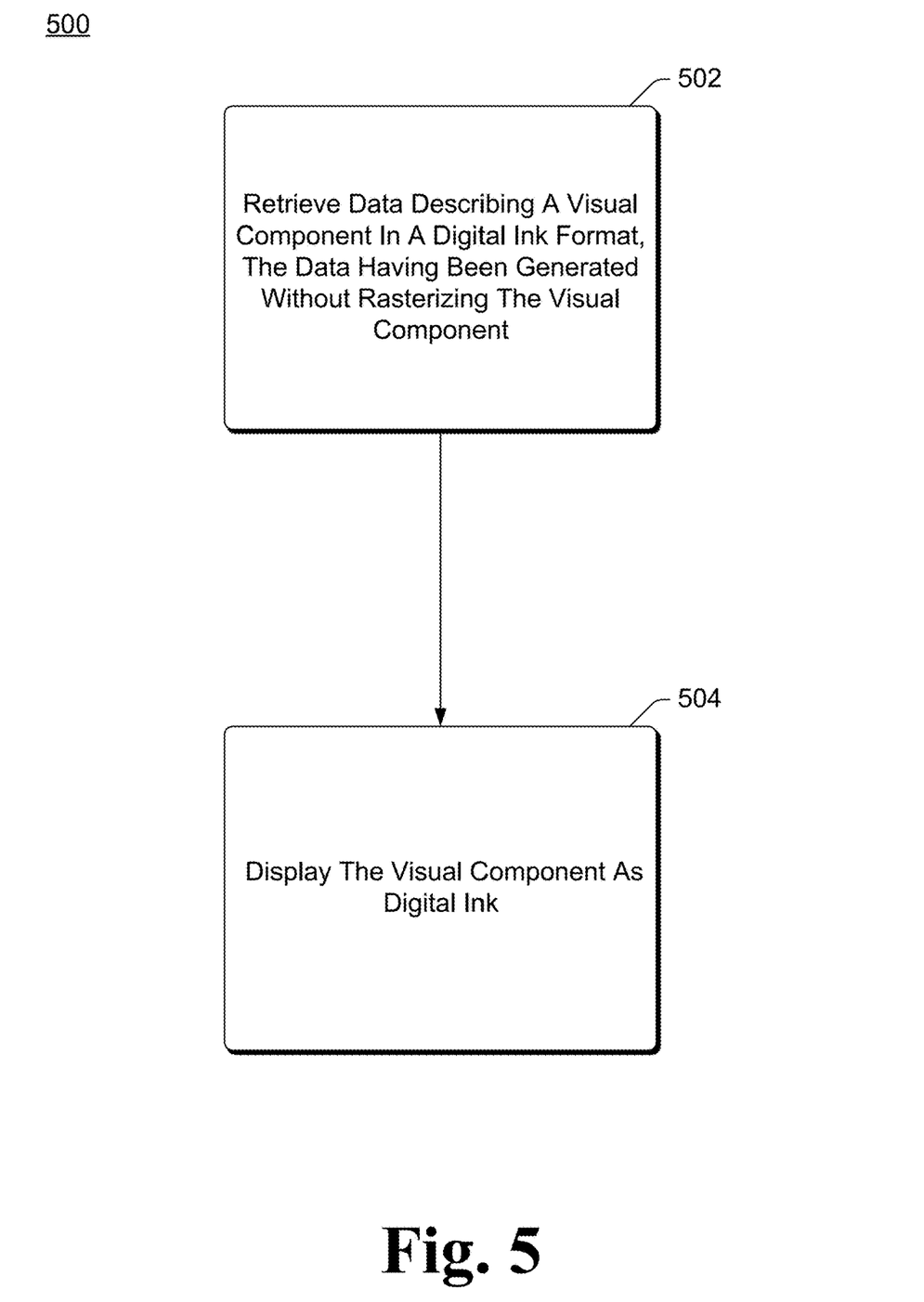
FIG. 5 is a flowchart illustrating an example process for displaying digital ink based visual components in accordance with one or more embodiments.

FIG. 5 is a flowchart illustrating an example process 500 for displaying digital ink based visual components in accordance with one or more embodiments. Process 500 is carried out by a device, such as computing device 102 of FIG. 1, and can be implemented in software, firmware, hardware, or combinations thereof. Process 500 is shown as a set of acts and is not limited to the order shown for performing the operations of the various acts. Process 500 is an example process for displaying digital ink based visual components; additional discussions of displaying digital ink based visual components are included herein with reference to different figures.

In process 500, data describing a visual component is retrieved from a visual component store (act 502). The data is data having been generated without rasterizing the visual component. As discussed above, the data is generated by obtaining multiple curves that combined to generate the visual component, converting the multiple curves into a set of primitives, and converting the set of primitives into a digital ink format. The data describing the visual component is generated, for example, using process 400 of FIG. 4.

The visual component is displayed as digital ink (act 504). Positioning information associated with the visual component is optionally used to display the visual component. The positioning information can be used in different manners to ensure that the visual component is displayed at a desired location, such as in line with other visual components being displayed. For example, the positioning information associated with each of multiple different visual components can be used to align the display of the multiple visual components (e.g., so that they appear to be displayed along a straight horizontal line).

The techniques discussed herein support any of a variety of different usage scenarios. In one or more embodiments, the techniques discussed herein are used to generate and display a font set. The font set includes multiple different letters, numbers, characters, and/or other symbols. By using the techniques discussed herein, devices can display the font set as digital ink rather than requiring other more resource intensive frameworks for displaying letters, numbers, characters, and/or other symbols.

In one or more embodiments, the techniques discussed herein are used to generate and display letters, numbers, characters, and/or other symbols in conjunction with other digital ink. For example, a program running on a computing device may display a ruler or protractor using digital ink. Numbers can be stored as visual components in the visual component store, and the program can further obtain the desired numbers from the visual component store and display those numbers on the ruler or protractor to identify desired distances, angles, and so forth.

In one or more embodiments, the techniques discussed herein are used to generate and display letters, numbers, characters, and/or other symbols that can be manipulated or animated. For example, a program can be a digital clock that displays the current time, and the visual components can include the numbers 0 through 9. As the current time changes, appropriate different ones of the visual components can be selected and displayed in place of the previously displayed visual component to show the animation or changing of time on the digital clock (e.g., each minute a different set of numbers is shown to reflect the current time).

Similarly, the visual components can be manipulated by the user, with a visual component being replaced by another appropriate visual component based on the manipulation. For example, the visual components may include multiple different circles, each of a different size. One of these circles can be displayed, and in response to a user input to manipulate the displayed circle (e.g., make the circle bigger), the displayed circle is replaced with a bigger circle (e.g., a circle with a larger diameter) that is obtained from the visual component store to show the manipulation.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
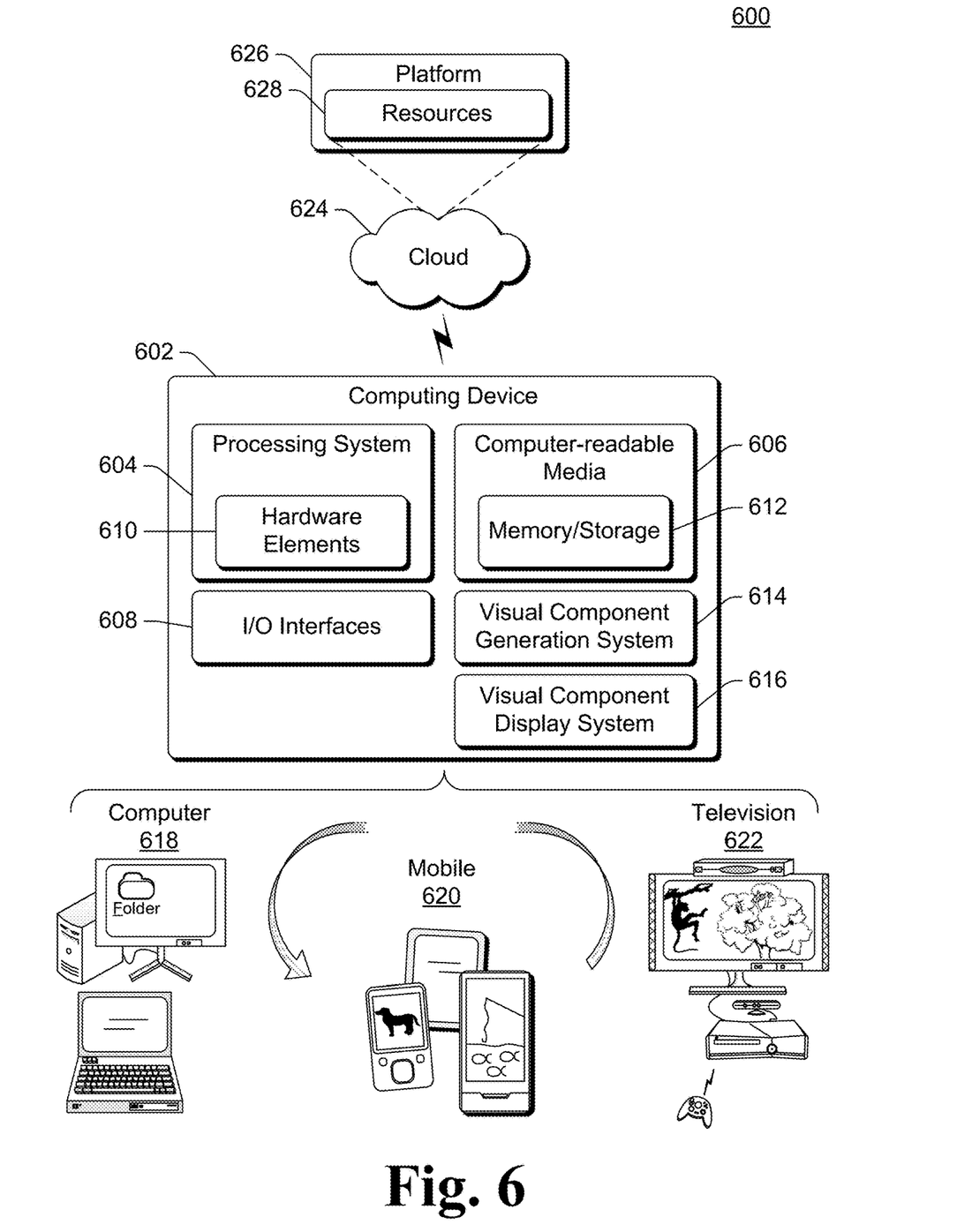
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Resistive RAM (ReRAM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a visual component generation system 614 and/or a visual component display system 616. The visual component generation system 614 provides various functionality for generating digital ink based visual components as discussed above. The visual component display system 616 provides various functionality for displaying digital ink based visual components as discussed above. The visual component generation system 614 can implement, for example, the visual component generation system 104 of FIG. 1. The visual component display system 616 can implement the visual component display system 106 of FIG. 1 and/or the visual component display system 308 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 618, mobile 620, and television 622 uses. Each of these configurations includes devices that may have generally different constructs and capabilities, and thus the computing device 602 may be configured according to one or more of the different device classes. For instance, the computing device 602 may be implemented as the computer 618 class of a device that includes a personal computer, desktop computer, a multi-screen computer, laptop computer, netbook, and so on.

The computing device 602 may also be implemented as the mobile 620 class of device that includes mobile devices, such as a mobile phone, portable music player, portable gaming device, a tablet computer, a multi-screen computer, and so on. The computing device 602 may also be implemented as the television 622 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 624 via a platform 626 as described below.

The cloud 624 includes and/or is representative of a platform 626 for resources 628. The platform 626 abstracts underlying functionality of hardware (e.g., servers) and software resources of the cloud 624. The resources 628 may include applications and/or data that can be utilized while computer processing is executed on servers that are remote from the computing device 602. Resources 628 can also include services provided over the Internet and/or through a subscriber network, such as a cellular or Wi-Fi network.

The platform 626 may abstract resources and functions to connect the computing device 602 with other computing devices. The platform 626 may also serve to abstract scaling of resources to provide a corresponding level of scale to encountered demand for the resources 628 that are implemented via the platform 626. Accordingly, in an interconnected device embodiment, implementation of functionality described herein may be distributed throughout the system 600. For example, the functionality may be implemented in part on the computing device 602 as well as via the platform 626 that abstracts the functionality of the cloud 624.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: obtaining multiple curves that combine to generate a visual component; converting the multiple curves into a set of primitives; converting the set of primitives into a digital ink format; and storing the visual component in the digital ink format.

Alternatively or in addition to any of the above described methods, any one or combination of: the primitives comprising paths that outline the multiple curves; the method further comprising obtaining positioning information for the visual component and storing the positioning information with the visual component; the method further comprising repeating the obtaining multiple curves, converting the multiple curves, converting the set of primitives, and the storing the visual component for each of multiple visual components, the multiple visual components comprising different characters of a font set; the method further comprising performing the obtaining the multiple curves, converting the multiple curves, converting the set of primitives, and storing the visual component without rasterizing the visual component; different ones of the multiple curves having different characteristics, the characteristics including widths; the method further comprising displaying the visual component by displaying the digital ink; the method further comprising showing animation by displaying an additional visual component in place of the visual component; the method further comprising showing manipulation of the visual component by displaying an additional visual component in place of the visual component.

A method comprising: retrieving, from a visual component store, data describing a visual component in a digital ink format, the data having been generated by obtaining multiple curves that combined to generate the visual component, converting the multiple curves into a set of primitives, and converting the set of primitives into a digital ink format without rasterizing the visual component; and displaying the visual component.

Alternatively or in addition to any of the above described methods, any one or combination of: the method further comprising obtaining positioning information for the visual component and the displaying comprising displaying the visual component in a location based at least in part on the positioning information; the method further comprising showing animation by displaying an additional visual component in place of the visual component; the method further comprising showing manipulation of the visual component by displaying an additional visual component in place of the visual component.

A computing device comprising: one or more processors; and one or more computer-readable storage media having stored thereon multiple instructions that, responsive to execution by the one or more processors, cause the one or more processors to: obtain multiple curves that combine to generate a visual component; convert the multiple curves into a set of primitives; convert the set of primitives into a digital ink format; and store the visual component in the digital ink format.

Alternatively or in addition to any of the above described computing devices, any one or combination of: the primitives comprising paths that outline the multiple curves; the multiple instructions further causing the one or more processors to obtain positioning information for the visual component and store the positioning information with the visual component; the multiple instructions further causing the one or more processors to repeat the obtaining multiple curves, converting the multiple curves, converting the set of primitives, and the storing the visual component for each of multiple visual components, the multiple visual components comprising different characters of a font set; different ones of the multiple curves having different characteristics, the characteristics including thicknesses; the multiple instructions further causing the one or more processors to display the visual component by displaying the digital ink; the multiple instructions further causing the one or more processors to show animation by displaying an additional visual component in place of the visual component.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   obtaining first and second curves positioned in overlap with one another at at least one point and that combine to generate a first visual component, the first curve having a first width and the second curve having a second width different than the first width;

converting the first and second curves into a first set of primitives;

converting the first set of primitives into a digital ink format that describes the first set of primitives without rasterization of the first visual component;

obtaining positioning information for the first visual component that refers to how the first visual component is positioned when displayed with another visual component; and storing the first visual component in the digital ink format.

2. The method as recited in claim 1, the primitives comprising paths that outline the first and second curves.

3. The method as recited in claim 1, further comprising storing the positioning information with the first visual component.

4. The method as recited in claim 1, further comprising, after obtaining the first and second curves:

obtaining third and fourth curves that combine to generate a second visual component;

converting the third and fourth curves into a second set of primitives;

converting the second set of primitives into a digital ink format that describes the second set of primitives without rasterization of the second visual component; and storing the first and second visual components, the first and second visual components comprising different characters of a font set.

5. The method as recited in claim 1, further comprising performing each of the obtaining the first and second curves, converting the first and second curves, converting the first set of primitives, and storing the first visual component without rasterizing the visual component.

6. The method as recited in claim 1, further comprising displaying the first visual component by displaying the digital ink.

7. The method as recited in claim 6, further comprising showing animation by displaying an additional visual component in place of the first visual component.

8. The method as recited in claim 6, further comprising showing manipulation of the first visual component by displaying an additional visual component in place of the visual component.

9. A computing device comprising:

one or more processors; and one or more computer-readable storage media having stored thereon multiple instructions that, responsive to execution by the one or more processors, cause the one or more processors to:

obtain first and second curves positioned in overlap with one another at at least one point and that combine to generate a first visual component, the first curve having a first width and the second curve having a second width different than the first width;

convert the first and second curves into a first set of primitives;

convert the first set of primitives into a digital ink format that describes the first set of primitives without rasterization of the first visual component;

obtain positioning information for the first visual component that refers to how the first visual component is positioned when displayed with another visual component; and store the first visual component in the digital ink format.

10. The computing device as recited in claim 9, the primitives comprising paths that outline the first and second curves.

11. The computing device as recited in claim 9, the multiple instructions further causing the one or more processors to store the positioning information with the first visual component.

12. The computing device as recited in claim 9, the multiple instructions further causing the one or more processors to, after obtaining the first and second curves:

obtain third and fourth curves that combine to generate a second visual component;

convert third and fourth curves into a second set of primitives;

convert the second set of primitives into a digital ink format that describes the second set of primitives without rasterization of the second visual component; and store the first and second visual components, the first and second visual components comprising different characters of a font set.

13. The computing device as recited in claim 9, the multiple instructions further causing the one or more processors to perform each of obtaining the first and second curves, converting the first and second curves and storing the first visual component without rasterizing the visual component.

14. The computing device as recited in claim 9, the multiple instructions further causing the one or more processors to display the first visual component by displaying the digital ink.

15. The computing device as recited in claim 14, the multiple instructions further causing the one or more processors to show animation by displaying an additional visual component in place of the first visual component.

16. A visual component generation system in a computer device, the visual component generation system comprising:

a processor; and a storage device that stores a computer program configured to be executed by the processor, the computer program including:

a curve identification module configured to obtain first and second curves positioned in overlap with one another at at least one point and that combine to generate a visual component, the first curve having a first width and the second curve having a second width different than the first width;

a primitive representation conversion module configured to convert the first and second curves into a set of primitives;

a digital ink conversion module configured to convert the set of primitives into a digital ink format that describes the set of primitives without rasterization of the visual component;

a positioning information collection module configured to obtain positioning information for the visual component that refers to how the visual component is positioned when displayed with another visual component; and a visual component storage module configured to store the visual component in the digital ink format.

17. The visual component generation system of claim 16, wherein the primitives comprise paths that outline the first and second curves.

18. The visual component generation system of claim 16, wherein the visual component storage module is further configured to store the positioning information with the visual component.

19. The visual component generation system of claim 16, wherein the curve identification module is configured to obtain the first and second curves, the primitive representation conversion module is configured to convert the first and second curves into a set of primitives, the digital ink conversion module is configured to convert the set of primitives into a digital ink format, and the visual component storage module is configured to store the visual component, each without rasterizing the visual component.

20. The visual component generation system of claim 16, wherein the wherein the curve identification module is further configured to provide an automated tool for specifying the first and second curves.

* * * * *